Jan. 5, 1943.  F. C. DAVIS  2,307,257
APPARATUS FOR HANDLING VEGETABLES OR THE LIKE
Filed March 6, 1940  2 Sheets-Sheet 1
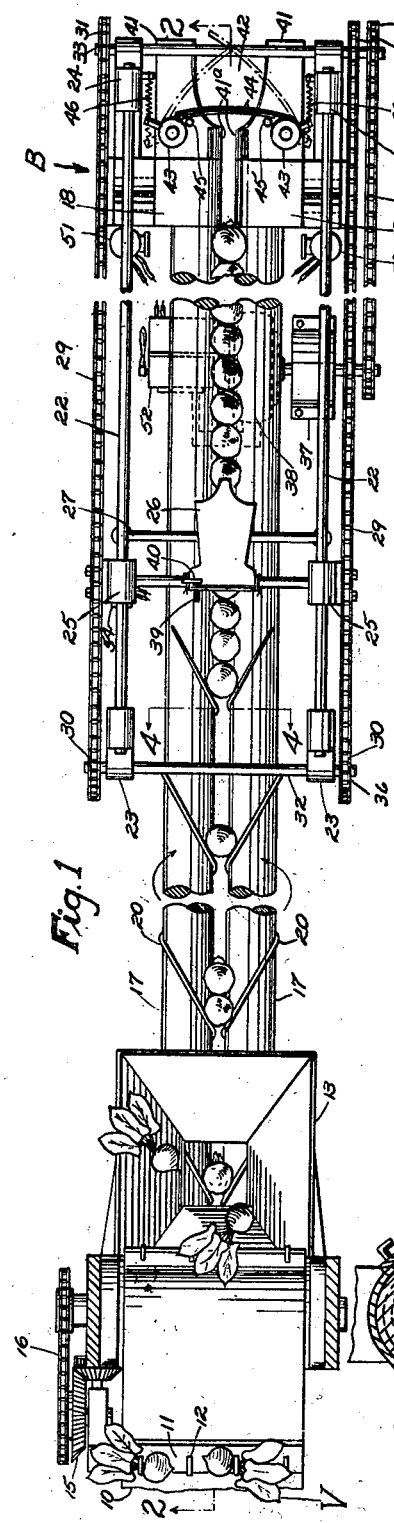
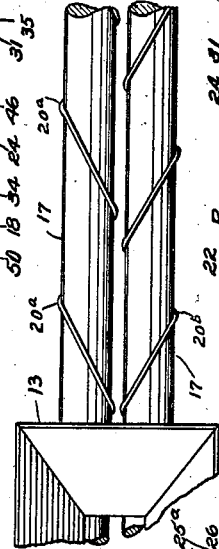
INVENTOR
FORD C. DAVIS
J Ralph Barron
ATTORNEYS

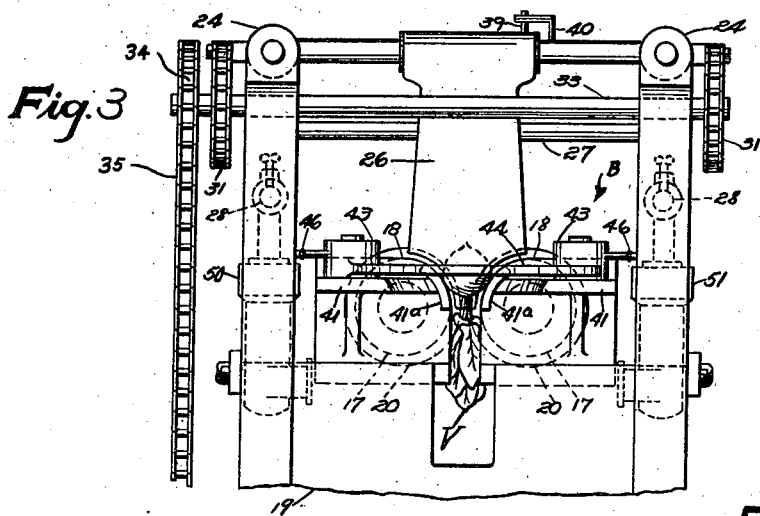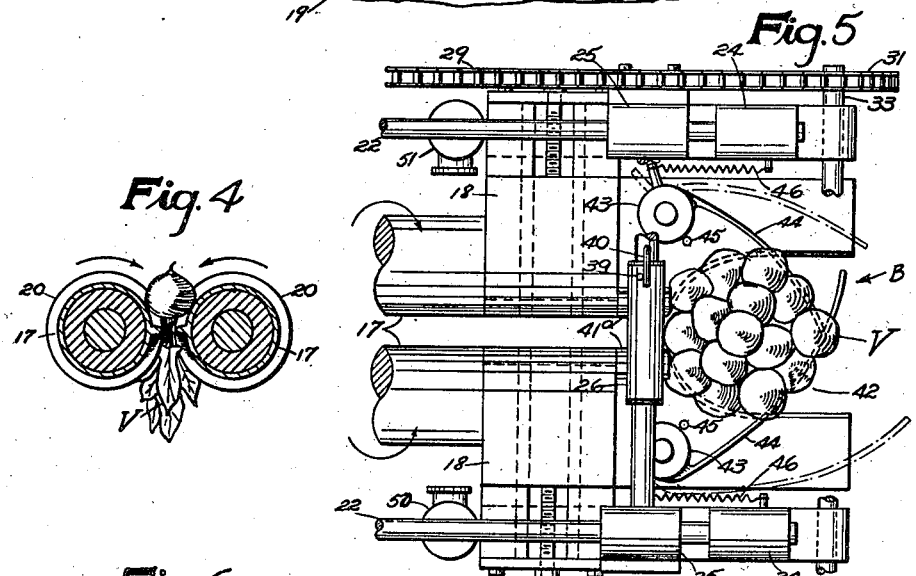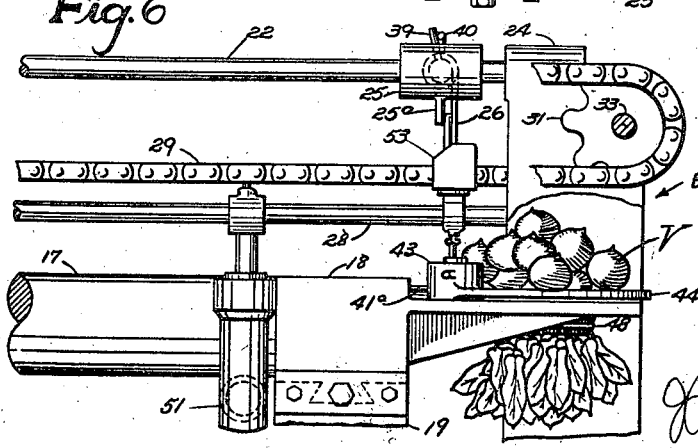

Patented Jan. 5, 1943

2,307,257

UNITED STATES PATENT OFFICE 2,307,257

APPARATUS FOR HANDLING VEGETABLES OR THE LIKE

Ford C. Davis, Hartville, Ohio

Application March 6, 1940, Serial No. 322,528

12 Claims. (Cl. 209—107)

This invention relates to apparatus for handling vegetables or the like, and particularly relates to conveyor mechanism in which vegetables or the like are prepared for market.

An object of the invention is to provide apparatus for washing or otherwise treating vegetables, such as radishes, turnips, beets, etc., and automatically assembling the same in bunches of substantially uniform size.

Another object of the invention is to provide apparatus of the character described in which root vegetables or the like are automatically assembled in bunches containing a substantially predetermined number of vegetables therein.

Another object of the invention is to provide apparatus of the character described in which root vegetables are arranged in groups of substantially uniform predetermined size.

Another object of the invention is to provide apparatus of the character described in which the vegetables are automatically arranged in inverted condition.

A further object of the invention is to provide apparatus of the character described in which the vegetables are automatically arranged and delivered in the same relative positions.

Another object of the invention is to provide apparatus of the character described in which root vegetables, supplied to the root-arranging mechanism in overly bunched or jumbled condition, will be automatically aligned in predetermined order.

A further object of the invention is to provide apparatus of the character described in which undersized vegetable are segregated from the others.

These and other objects of the invention will be manifest from the following brief description and the accompanying drawings.

This application is a continuation in part of application, Serial No. 255,083, filed February 7, 1939, now Patent Number 2,219,809, granted October 29, 1940.

Of the accompanying drawings:

Figure 1 is a plan view, partly broken away, of the apparatus embodying the invention.

Figure 2 is a cross-section on line 2—2 of Figure 1.

Figure 3 is an enlarged end elevation, partly broken away, of the apparatus as viewed from right of Figure 1.

Figure 4 is a cross-section taken on line 4—4 of Figure 1.

Figure 5 is an enlarged fragmentary plan view of the bunching mechanism after a bunch has been formed.

Figure 6 is a side elevation, partly broken away, of the mechanism shown in Figure 5.

Figure 7 is an end elevation, partly broken away, as viewed from the left of Figure 2.

Figure 8 is a fragmentary plan view, illustrating a modified form of the rolls.

Figure 9 is a view similar to Figure 8, on a smaller scale, illustrating another modified form of the rolls.

The numeral 10 designates an upwardly inclined endless conveyor having thereon cross-pieces 11, 11, on which are hooks 12 designed to engage with vegetables V, supplied at a suitable source of supply (not shown), and to deliver them to a hopper 13. Conveyor 10 may be driven by a drive chain 14, through bevel gears 15 and 16 driven by any suitable means (not shown).

The hopper 13 is arranged to receive vegetables V as they drop off the upper end of conveyor 10, and to deposit them between a pair of rolls 17, 17 adjacent the ends thereof, the rolls 17 being journalled in laterally adjustable bearings 18, 18, on a suitable frame 19. Rolls 17 are spaced apart a suitable distance to retain root vegetables of a determinate size thereon, and to permit the tops of the vegetables to be urged therebetween by rotation of the rolls inwardly toward the bight thereof at the top of the rolls. As shown in full lines in Figure 7, the rolls 17 may be driven by sprockets 17$^a$, 17$^a$ thereon, a driven chain 17$^b$ from a source of power (not shown) being engaged over one sprocket and under the other to rotate the rolls inwardly from the tops thereof in opposite directions. The inward rotation of the rolls causes the vegetables to be automatically inverted, or held in inverted position, with the tops extending downwardly. The surfaces of the rolls 17 may be of rubber or similar material to minimize the danger of bruising the vegetables.

The rolls 17 may have projecting helical ribs or webs 20, preferably formed of rubber or similar materials, extending from the hopper end along a substantial proportion of the total length of the rolls. These helical ribs may be arranged to move the vegetables longitudinally along the rolls toward a bunching device, subsequently to be described, the length of the helically ribbed portions of the rolls being sufficient to assure that all of the vegetables will be in inverted position before reaching the bunching mechanism. As best observed in Figures 3 and 4, the helical ribs 20 project outwardly from the rolls 17 a relatively short distance, in proportion to the size of the vegetable roots, and hence the space between the rolls, so as to permit the tops of the vegetables to extend freely downward between the rolls without being crushed between the ribs thereof.

Suitable spray nozzles 21 may be arranged to project a spray of water over the vegetables as they move along the rolls, thereby thoroughly to wash the vegetables before they pass on to the buncher. Water from the washing operation is effective to lubricate the rolls 17 so that the vegetables more readily move thereon, and is further effective to aid in arranging the vegetables in inverted position between the rolls.

One of the rolls 17 may be driven at a greater peripheral speed than the other, by making one of the sprockets 17a suitably smaller than the other, as indicated in chain-dotted lines in Figure 7. This will cause the helical ribs 20 on the faster driven roll to move toward the discharge or bunching end of the rolls at faster speed, which is particularly desirable when the root vegetables may be supplied in such numbers that they fall on top of each other on the rolls in tangled bunches. In such case the differential movements of the ribs 20 will operate to segregate the tangled roots and string them along between the rolls before they reach the bunching mechanism. A similar result to that just described may be obtained by means of the modified construction of rolls 17, 17, shown in Figure 8, in which the helical ribs 20a of one of the rolls is formed with a relatively longer pitch than rib 20b of the other roll.

As shown in Figure 9, the rolls 17 may be provided with helical ribs 20c, 20c of substantially the same pitch, but arranged along the rolls in staggered relation. This aids the process of feeding the root vegetables along the rolls in inverted positions and, because the ribs 20c of the respective rolls never come together, the downwardly extending tops of the vegetables will not be crushed thereby.

A suitable proportion of the length of the rolls 17, at the end remote from hopper 13, preferably is smooth and unobstructed by helical ribs to permit the vegetables to be progressively urged along the rolls by contact of one with the other after passing out of engagement with the helical ribs 20, as best shown in Figures 1 and 2. Arranged adjacent the smooth end portions of rolls 17 may be a pair of longitudinally extending rails 22, 22 supported on upwardly extending brackets 23, 23 and 24, 24. A cross-head 25 slidably mounted between the elements 22 preferably has pivotally mounted thereon a suitably shaped plate 26, normally held upwardly out of contact with the vegetables V on rolls 17, by means of a laterally extending rod 27 adjustably secured to a pair of bars 28, the latter being fixed between the brackets 23 and 24 (see Figures 1 and 2). For slidably reciprocating cross-head 25 on rails 22 from and toward a buncher B, the cross-head may have attached to the outer ends thereof endless chains 29, 29 engaged about sprockets 30, 30 and 31, 31, keyed on transverse shafts 32 and 33, journalled in supports 23, 23 and 24, 24, respectively. Shaft 33 is driven by a drive chain 34, extended between a sprocket 35 on shaft 33 and a sprocket 36 driven, through a reduction gearing 37, by a suitable reversing type motor 38.

Plate 26, upon becoming disengaged with rod 27, drops to a vertical position between two adjacent vegetables, as shown in chain-dotted lines in Figure 2, during the initial movement of cross-head 25 toward buncher B. Rearward movement of plate 26, from this vertical position, is prevented by a pin 39 thereon engaging a stop 40 on cross-head 25, so that as the plate continues to be urged forwardly to the position thereof shown in Figures 5 and 6, it engages behind one vegetable and urges it and a substantially predetermined number of vegetables ahead of it along the smooth part of the rolls 17 toward buncher B.

For bunching the vegetables there may be mounted on the forward ends of bearings 18 a pair of spaced, horizontally disposed, plates 41, 41, the upper faces of which are in substantial alignment with average lines of contact between the roots of vegetables V and the surfaces of rolls 17. Plates 41 preferably have at the inner edges thereof vertically extending members 41a, 41a, the inner surfaces of which are in alignment with the top inner surfaces of bearings 18, which in turn are in alignment with the surfaces of rolls 17. The plates 41 may be shaped to provide a central opening 42 communicating with the space between the plates 41a, this opening preferably being slightly smaller across than the average diameter of a finished bunch so that the roots will be retained on plates 41, with the tops of the vegetables extending through the opening, after the bunch is formed (see Figure 5).

Pivoted at 43, 43 on plates 41 may be a pair of oppositely disposed, preferably forwardly curved bars 44, 44 which normally extend across opening 42, urged into cooperating overlapped relation, against stop pins 45, 45 by suitably arranged springs 46, 46, substantially closing the opening, as shown in full lines in Figure 1. One of the bars 44 preferably is longer than the other so that the bars will be urged into the same relative positions after each bunching operation. Movement of plate 26 from the chain-dotted position thereof shown in Figure 2 to the position shown in Figures 5 and 6, urges a substantially predetermined number or quantity of vegetables, assembled at the smooth end of rolls 17, at first successively one against the other and then into bunched relation against the bars 44, the latter being yieldably opened up a suitable amount to shape the bunch over the opening 42, as plate 26 approaches its forward stop position, best shown in Figure 5. It is to be understood that as the bunch is being formed over opening 42 the vegetables are yieldably urged one against the other between plate 26 and bars 44 in a manner that does not permit any of the vegetables to become loose and fall through the opening 42. The bars 44 may be relatively narrow so that they will be urged under the outermost roots, to retain the bunch thereon as well as on portions of plates 41 about the opening 42, the tension of springs 46 being such that after plate 26 returns to its starting position the bars 44 are retained forwardly about the tops without urging any of the roots back along the plates 41a. After the bunch is thus formed an operator may place tying means 48, such as an elastic band, about the tops and then remove the bunch by yieldingly urging it past the ends of the bars 44 (see chain-dotted lines in Figure 5) to be packed in the usual manner for marketing.

For predetermining the size of the bunch to be formed in buncher B, an electric-eye device, comprising a light-sensitive tube 50 and a beam-directing tube 51 mounted opposite each other on the bars 28, may be utilized. Tubes 50 and 51 preferably are longitudinally adjustable for regulating the size of the bunch or quantity of vegetables formed in the bunch. The beam from tube 51 preferably crosses the path of the tops of the vegetables projecting beneath the rolls. As soon as the first forwardly moving vegetable of each series forming a bunch intercepts the beam from tube 51, a suitable switch (not shown), in a circuit box 52, is actuated to start motor 38, thereby driving chain 29 to move plate 26 toward buncher B. When plate 26 reaches the end of its forward stroke a limit switch 53, adjustably mounted on one of the bars 28, is actuated by a lug 25ᵃ on cross-head 25 to stop motor 38. After the bunch is formed the operator may press a push button (not shown) to reverse motor 38 and thereby return plate 26 to its original position where lug 25ᵃ trips a switch 54 to stop the motor and automatically set the electrical circuit in condition for the next bunching operation. It is to be understood that the tying means 48 may be applied to a bunch by mechanical means (not shown).

In the operation of the apparatus the vegetables are conveyed to hopper 13 by conveyor 10 from which they are deposited on the rolls 17, the latter preferably being continuously driven. The inward rotation of the rolls at the top thereof causes the tops of the vegetables to be urged downwardly through the space between the rolls, the rolls being set apart at such distance that only roots over a minimum size will be retained thereon in uniformly inverted position, while smaller vegetables will drop through, and the space between the ribs 20 being such that the downwardly extending tops of the vegetables may pass freely along the rolls without being crushed by said ribs. The ribs 20 on the rolls carry the vegetables forwardly, past the spray from nozzle 21 to be thoroughly washed.

Upon leaving the helically ribbed portions of the rolls 17, each vegetable is propelled along the bare portion of the rolls by vegetables immediately behind it. When the leading vegetable intercepts the light beam from tube 51, the tube 50 is actuated to start motor 38 which causes crosshead 25 to be moved forwardly along the rails 22. This disengages plate 26 from rod 27, which normally holds plate 26, in the inoperative position thereof, out of contact with the vegetables on the rolls, and plate 26 is permitted to drop between two adjacent roots and propel the forward one and all those ahead of it toward buncher B. Continued movement of plate 26 toward the forward stop position thereof causes the propelled vegetables to be yieldingly urged against the bars 44, and the vegetables are thereby arranged in a bunch over opening 42 between the plates 41. Since a yielding pressure is maintained between adjacent vegetables while the bunch is being formed, none of the vegetables will drop through opening 42. While the tye 48 is being placed on the bunch, by hand or mechanical means (not shown), circuit switch 53 or a push button (not shown) in the meantime may be actuated to reverse motor 38 and return plate 26 to the starting position thereof, whereupon switch 54 is actuated to stop motor 38 and set the light sensitive tubes 50, 51 and the electrical circuit in condition for another bunching operation.

It will be apparent from the foregoing brief description that the invention provides simple, economical apparatus for washing or otherwise treating vegetables and arranging the same in uniform bunches with all of the vegetables in the same relative position.

Modifications of the invention may be resorted to without departing from the spirit therof or the scope of the appended claims. It is to be understood that the vegetable conveying and inverting apparatus is capable of general application and is not necessarily limited to use in a combination with a spraying device, or with a bunching mechanism.

What is claimed is:

1. Apparatus of the character described comprising a pair of spaced elements having smooth surfaces throughout their lengths, means for moving the surfaces of said elements inwardly and downwardly in the bight between them, the adjacent surfaces of said elements being substantially equally spaced along said lengths thereof, means for supplying root vegetables into said bight at one end of said elements, and means between said spaced elements for feeding the vegetables from said end of the elements toward the other end thereof, said elements causing said vegetables to assume inverted positions by engaging and moving the tops thereof down between the elements, said elements being spaced to retain roots of desired minimum size thereon, said feeding means being arranged relative to the space between said elements to permit the vegetable tops to pass along between the elements without substantially crushing the tops.

2. Apparatus of the class described, comprising a pair of spaced rolls having smooth surfaces throughout their lengths, means for rotating the same inwardly of the upper bight thereof, the surfaces of said rolls being substantially equally spaced along the lengths thereof, means for supplying a quantity of root vegetables into said upper bight at one end of the rolls, and means on said rolls actuated by rotation thereof for feeding the vegetables from said end of the rolls toward the other end thereof, said rolls causing said vegetables to assume inverted positions by engaging and moving the tops thereof down between the rolls, said rolls being spaced so as to retain roots of a desired size thereon, said feeding means being spaced to permit the vegetable tops to pass along between the rolls without substantially crushing or tearing the tops.

3. Apparatus of the character described, comprising a pair of spaced elements, means for moving the surface of at least one of said elements inwardly and downwardly toward the bight between the elements, the surfaces of said elements adjacent said bight being substantially equally spaced along the lengths thereof, means for supplying a quantity of root vegetables into said bight at one end of said elements, and means for feeding the vegetables from said end of the elements toward the other end thereof, said elements having smooth surfaces throughout their lengths causing said vegetables to assume inverted positions by engaging and moving the tops thereof down between the elements, said elements being spaced to retain roots of desired size thereon, said feeding means being arranged relative to the space between said elements to permit the vegetable tops to pass along between the elements without substantially crushing the tops.

4. Apparatus of the character described comprising a pair of spaced rolls, means for rotating said rolls in opposite directions inwardly of the upper bight between the same, means for supplying root vegetables into said bight at one end of the rolls, said rolls being spaced so as to retain roots of desired size thereon, inward rotation of said rolls causing said vegetables to assume inverted positions by engaging and moving the tops thereof down between the rolls, and means on each of said rolls and operable by rotation thereof for feeding the vegetables from said end of the rolls toward the other end thereof, said feeding means on the respective rolls being operable at relatively different speeds so as to string the vegetables along the rolls, said feeding means being arranged relative to said space between the rolls to permit the vegetable tops to pass along between the rolls without substantially crushing or tearing the tops.

5. Apparatus of the character described comprising a pair of spaced elements adapted to retain vegetable roots of minimum size thereon, said vegetables being supplied to the upper bight between the elements at one end thereof, and means associated with each of said elements operable with movement thereof to engage opposite sides of roots between the elements at relatively different speeds for feeding the vegetables singly from said end of the elements toward the other end thereof, said vegetables thereby assuming inverted positions along the elements with the tops thereof engaging down between the elements, said feeding means being arranged relative to the space between said elements to permit the vegetable tops to pass along between the elements without substantially crushing the tops.

6. Apparatus of the character described comprising a pair of spaced elements adapted to retain vegetable roots of minimum size thereon, said vegetables being supplied to the upper bight between the elements at one end thereof, means for moving the surfaces of said elements in opposite directions inwardly of the upper bight between the same, and means associated with each of said elements operable therewith to engage opposite sides of roots between the elements at relatively different speeds for feeding the vegetables singly from said end of the elements toward the other end thereof, said vegetables thereby assuming inverted positions along the elements with the tops thereof engaging down between the elements, said feeding means of the respective elements being spaced to permit the vegetable tops to pass along between the elements without substantially crushing or tearing the tops.

7. Apparatus of the character described comprising a pair of spaced rolls adapted to retain vegetable roots of minimum size thereon, said vegetables being supplied to the upper bight between the rolls at one end thereof, means for rotating said rolls in opposite directions inwardly of the upper bight between the same, means on the surface of a first of said rolls operable by rotation thereof to feed the vegetables from said end of the rolls to the other end thereof, and means on the surface of the other of said rolls operable by rotation thereof tending to feed said vegetables along the rolls at relatively greater speed than the feeding means on said first roll to arrange the vegetables in unbunched condition between the rolls, said vegetables thereby assuming uniformly inverted positions along the rolls with the tops thereof engaging down between the same, said feeding means of the respective rolls being so spaced from the surfaces thereof as to permit the vegetable tops to pass along between the rolls without being substantially crushed or torn.

8. Apparatus of the character described comprising a pair of spaced rolls adapted to retain vegetable roots of minimum size thereon, said vegetables being supplied to the upper bight between the rolls at one end thereof, means for rotating said rolls in opposite directions inwardly of the upper bight between the same, and means projecting from the surfaces of said rolls and operable by rotation of the rolls to engage the roots of said vegetables and feed the same from said end of the rolls to the other end thereof, said vegetables thereby assuming inverted positions along the rolls with the tops thereof engaging down between the same, said feeding means being proportioned relative to each other and relative to the space between the rolls so as to engage said roots without substantially crushing or tearing the downwardly extending tops thereof.

9. Apparatus of the character described comprising a pair of spaced rolls adapted to retain vegetable roots of minimum size thereon, said vegetables being supplied to the upper bight between the rolls at one end thereof, the surfaces of said rolls adjacent said bight being substantially uniformly spaced along the lengths thereof, means for rotating said rolls in opposite directions inwardly of the upper bight between the same, said rolls having oppositely winding helical ribs thereon operable by rotation of the rolls to engage the roots of said vegetables and feed the same from one end of the rolls to the other, said vegetables thereby assuming inverted positions along the rolls with the tops thereof engaging down between the same, the heights of said helical ribs from the surfaces of said rolls being proportioned relative to the space between the rolls so that the ribs will engage said roots but will permit the tops to pass along between the rolls without substantially crushing or tearing the same.

10. Apparatus of the character described comprising a pair of spaced rolls adapted to retain vegetable roots of minimum size thereon, said vegetables being supplied to the upper bight between the rolls at one end thereof, means for rotating said rolls in opposite directions inwardly of the upper bight between the same, said rolls having oppositely winding helical ribs thereon operable by rotation of the rolls to engage the roots of said vegetables and feed the same from one end of the rolls to the other, said vegetables thereby assuming inverted positions along the rolls with the tops thereof engaging down between the same, the heights of said helical ribs being such that the vegetable tops may pass along between the rolls without being substantially crushed or torn thereby, one of said rolls being driven at greater peripheral speed than the other whereby the helical rib thereof tends to urge said roots along the rolls at greater speed than the helical rib of the other roll, whereby the roots are arranged in unbunched relation between the rolls.

11. Apparatus of the character described comprising a pair of spaced rolls adapted to retain vegetable roots of minimum size thereon, said vegetables being supplied to the upper bight between the rolls at one end thereof, means for rotating said rolls in opposite directions inwardly of the upper bight between the same, said rolls having helical ribs thereon operable by rotation of the rolls to engage the roots of said vegetables and feed the same from one end of the rolls to the other, said vegetables thereby assuming inverted positions along the rolls with the tops thereof engaging down between the same, the helical rib of one of said rolls having a relatively shorter pitch than the helical rib of the other roll, whereby said shorter helical rib will tend to urge said roots along the rolls at greater speed than the helical rib of said other roll for arranging the roots in unbunched condition between the rolls.

12. Apparatus of the character described comprising a pair of spaced rolls adapted to retain vegetable roots of minimum size thereon, said vegetables being supplied to the upper bight between the rolls at one end thereof, means for rotating said rolls in opposite directions inwardly of the upper bight between the same, said rolls having oppositely winding helical ribs thereon operable by rotation of the rolls to engage the roots of said vegetables and feed the same from one end of the rolls to the other, said vegetables thereby assuming inverted positions along the rolls with the tops thereof engaging down between the same, the helical rib of one of said rolls being in staggered relation to the helical rib of the other roll for arranging the roots in unbunched condition between the rolls, the staggered arrangement of the ribs permitting the vegetable tops to pass along between the rolls without substantially crushing or tearing the same.

FORD C. DAVIS.